(12) United States Patent
Main

(10) Patent No.: US 9,353,891 B1
(45) Date of Patent: May 31, 2016

(54) GARDEN HOSE GUIDE

(71) Applicant: Sylvia Main, Warren, OR (US)

(72) Inventor: Sylvia Main, Warren, OR (US)

( * ) Notice: Subject to any disclaimer, the term of this patent is extended or adjusted under 35 U.S.C. 154(b) by 0 days.

(21) Appl. No.: 14/700,380

(22) Filed: Apr. 30, 2015

(51) Int. Cl.
*B05B 15/06* (2006.01)
*F16L 3/12* (2006.01)
*F16L 3/127* (2006.01)

(52) U.S. Cl.
CPC .............. *F16L 3/1226* (2013.01); *F16L 3/127* (2013.01); *F16L 3/1222* (2013.01)

(58) Field of Classification Search
CPC .... B05B 15/062; B05B 15/063; A01G 25/00; A01G 13/0293; A01K 1/04
USPC ..................................................... 248/76, 85
See application file for complete search history.

(56) References Cited

U.S. PATENT DOCUMENTS

| | | | | |
|---|---|---|---|---|
| 2,060,390 A * | 11/1936 | Adams | .................. | B05B 15/062 248/88 |
| 2,425,893 A * | 8/1947 | Molitor | ................. | B05B 15/062 248/87 |
| 2,484,794 A * | 10/1949 | Reuter | .................. | B05B 15/062 220/628 |
| 3,239,174 A | 3/1966 | Churchman | | |
| 5,158,254 A * | 10/1992 | Remby | ................... | B05B 15/00 248/156 |
| 5,573,226 A | 11/1996 | Smith | | |
| D470,035 S * | 2/2003 | Tisbo | ................................ | D8/1 |
| 7,673,588 B2 * | 3/2010 | Head | ........................ | A01K 1/04 119/786 |
| 8,286,892 B1 * | 10/2012 | Schwanebek | ......... | B05B 15/062 239/1 |
| 8,561,951 B2 | 10/2013 | Wills et al. | | |

* cited by examiner

*Primary Examiner* — Rodney Mintz
*Assistant Examiner* — Daniel Kenny
(74) *Attorney, Agent, or Firm* — Crossley & Stevenson IP Law

(57) ABSTRACT

A garden hose guide including a base having a semicircular top half and a bottom half, a spiral stake having a bottom end and a top end, a torsion member medially disposed within the base, and a circular aperture continuously disposed from a right portion to a left portion of the top half of the base. The torsion member has an upper end, a lower end, a right end region, and a left end region. Each of the right end region and the left end region is disposed outside of the base. The aperture is configured to slidably engage an exterior surface of a garden hose.

4 Claims, 4 Drawing Sheets

GARDEN HOSE GUIDE

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of hose guides are known in the prior art. However, what has been needed is a garden hose guide including a base having a top half and a bottom half, a spiral stake having a top end and a bottom end, a torsion member having an upper end, a lower end, a right end region, and a left end region, and a circular aperture continuously disposed from a right portion to a left portion of the top half of the base. What has been further needed is for the torsion member to be medially disposed within the base, with the lower end of the torsion member attached to the top end of the spiral stake. Lastly, what has been needed is for the aperture to be configured to slidably engage an exterior surface of a garden hose. Unlike the current selection of hose guides on the market, this garden hose guide provides a much more stable means of securing a garden hose above a plant or flower garden, since a length of the garden hose is disposed within the opening in the base. Additionally, the garden hose guide provides an easier and more energy efficient means to secure the spiral stake within the ground. Each of the left end region and the right end region of the torsion member is deliberately disposed outside of the base at a length of at least two inches so that a user can grip the left end region and the right end region to rotate the spiral stake into the ground. The right end region and the left end region can optionally be rubberized for ease of use. The bottom half of the base can be produced in varying heights to properly accommodate the heights of the plants or flowers over which the garden hose will remain suspended. Lastly, the top half of the garden hose guide can be decorated with numerous designs and colors so as to double as a decorative lawn ornament for a person's yard.

FIELD OF THE INVENTION

The present invention relates to hose guides, and more particularly, to a garden hose guide.

SUMMARY OF THE INVENTION

The general purpose of the present garden hose guide, described subsequently in greater detail, is to provide a hose guide which has many novel features that result in a garden hose guide which is not anticipated, rendered obvious, suggested, or even implied by prior art, either alone or in combination thereof.

To accomplish this, the present garden hose guide comprises a base. The base comprises a semicircular top half and a bottom half. Each of the top half and the bottom half has a bottom surface, a right portion, and a left portion. The top half has a top surface. The bottom half of the base can optionally be concave. A spiral stake has a bottom end and a top end. A torsion member has an upper end, a lower end, a right end region, and a left end region. The torsion member is medially disposed within the base from the bottom surface of the bottom half to the bottom surface of the top half. The lower end of the torsion member is attached to the top end of the spiral stake. Each of the right end region and the left end region of the torsion member is disposed outside of the base at a length of at least two inches. Each of the right end region and the left end region are optionally rubberized.

A single circular aperture is continuously disposed from the right portion to the left portion of the top half proximal the bottom surface of the top half. The aperture is disposed parallel to the upper end of the torsion member. A diameter of the aperture substantially conforms to a diameter of a garden hose. The aperture is configured to slidably engage an exterior surface of the garden hose.

Thus has been broadly outlined the more important features of the present garden hose guide so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
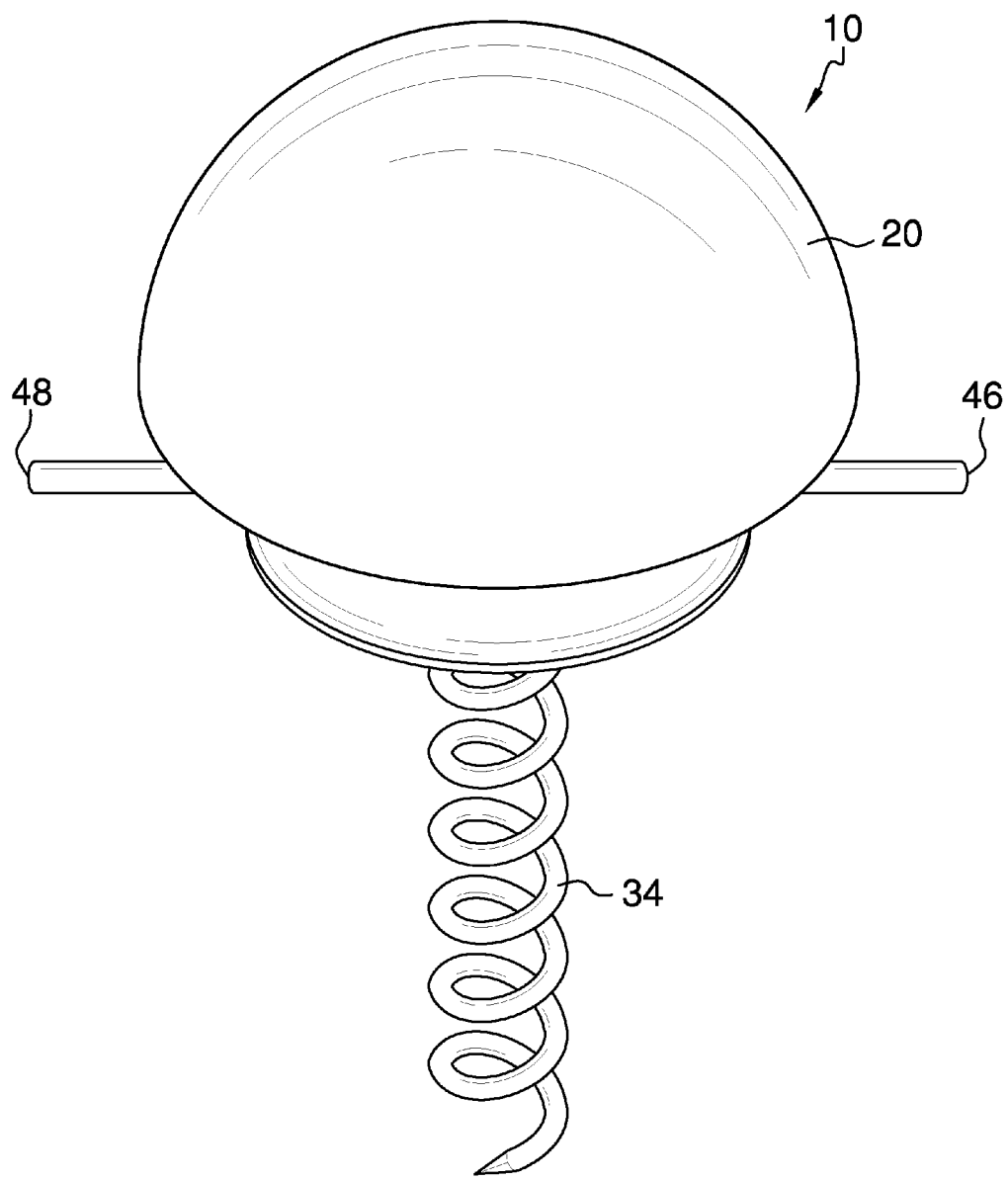
FIG. 1 is a front isometric view.
Figure 2:
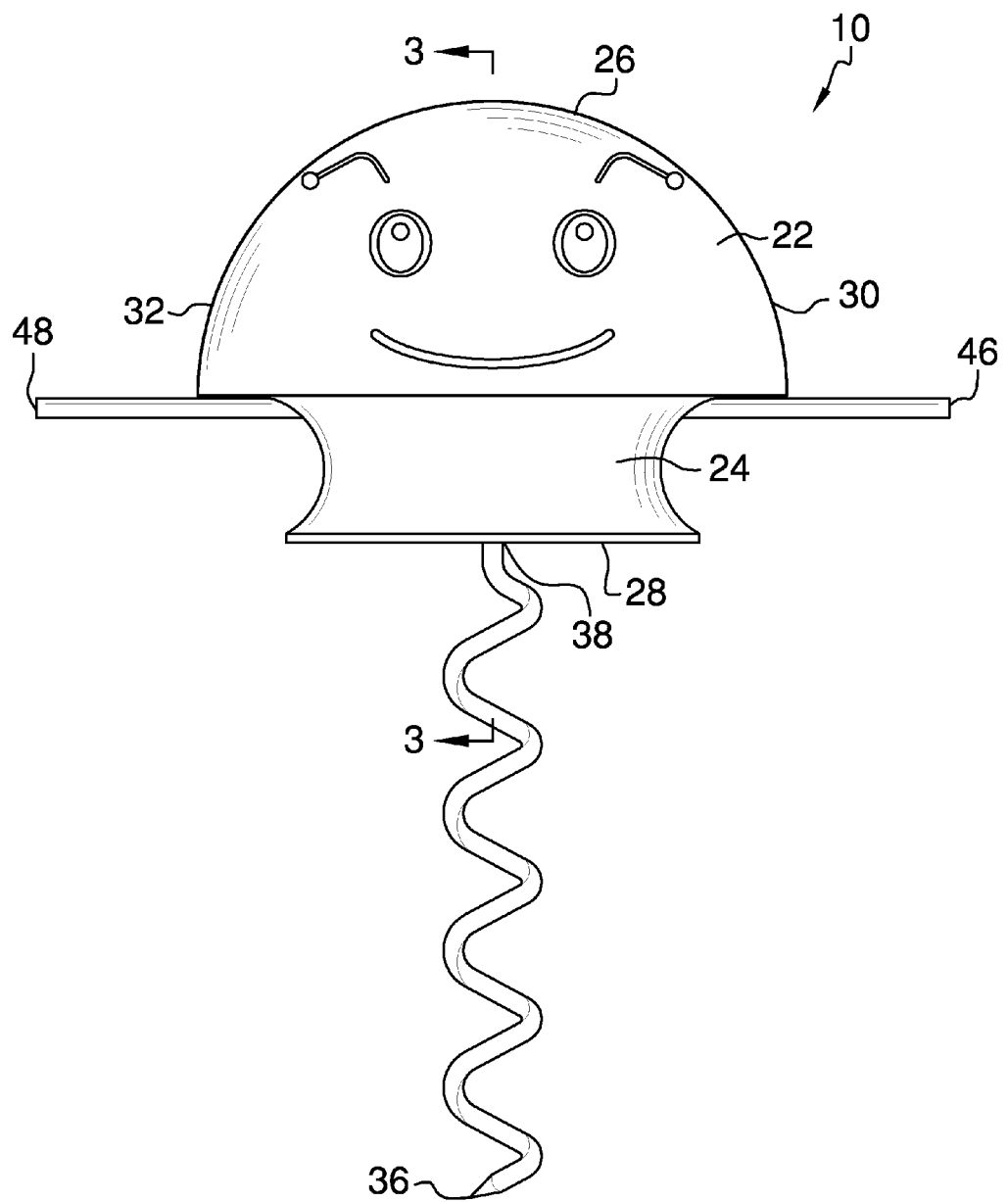
FIG. 2 is a front elevation view.
Figure 3:
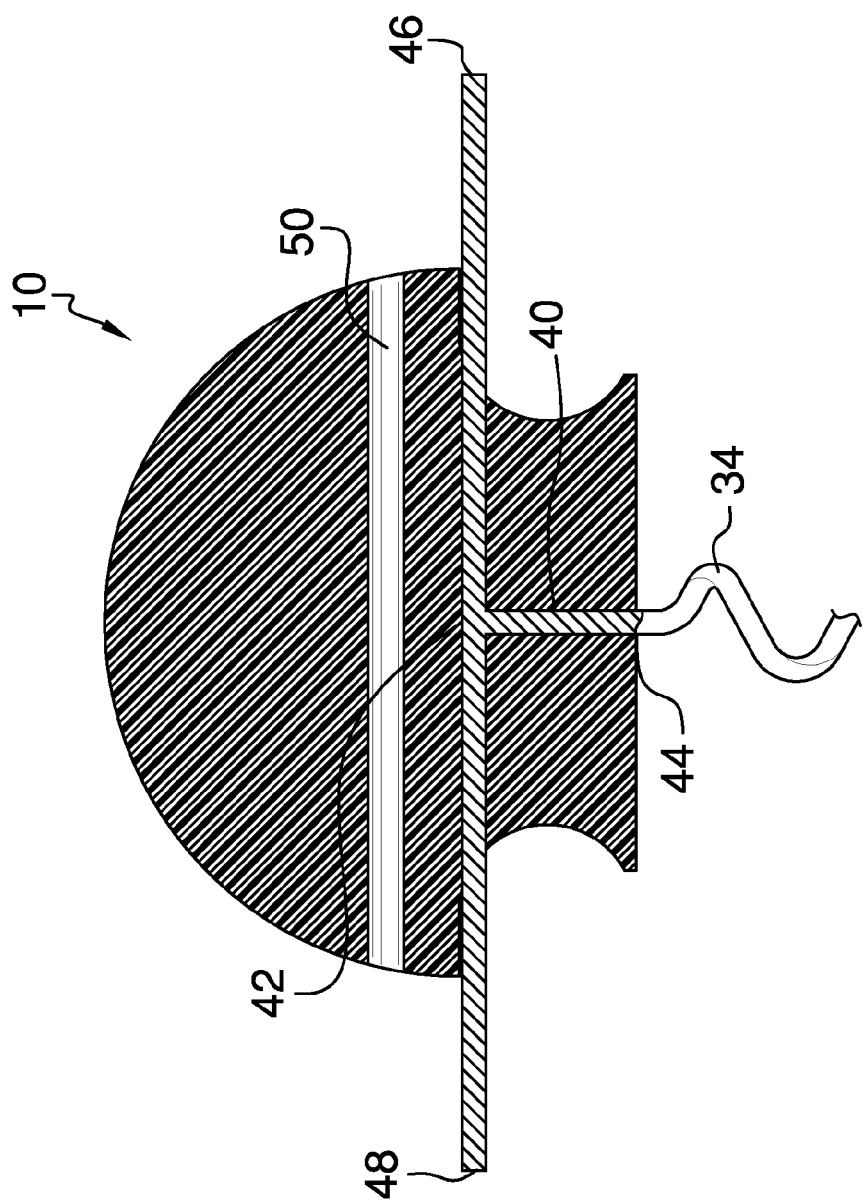
FIG. 3 is a cross-sectional view taken along line 3-3 of FIG. 2.

With reference now to the drawings, and in particular FIGS. 1 through 4 thereof, an example of the instant garden hose guide employing the principles and concepts of the present garden hose guide and generally designated by the reference number 10 will be described.

Referring to FIGS. 1 through 4 the present garden hose guide 10 is illustrated. The garden hose guide 10 comprises a base 20. The base 20 comprises a semicircular top half 22 and a bottom half 24. Each of the top half 22 and the bottom half 24 has a bottom surface 28, a right side portion 30, and a left side portion 32. The top half 22 has a top surface 26. A spiral stake 34 has a bottom end 36 and a top end 38. A torsion member 40 has an upper end 42, a lower end 44, a right end region 46, and a left end region 48. The torsion member 40 is medially disposed within the base from the bottom surface 28 of the bottom half 24 to the bottom surface 28 of the top half 22. The lower end 44 of the torsion member 40 is attached to the top end 38 of the spiral stake 34. Each of the right end region 46 and the left end region 48 of the torsion member 40 is disposed outside of the base 20 at a length of at least two inches.

Figure 4:
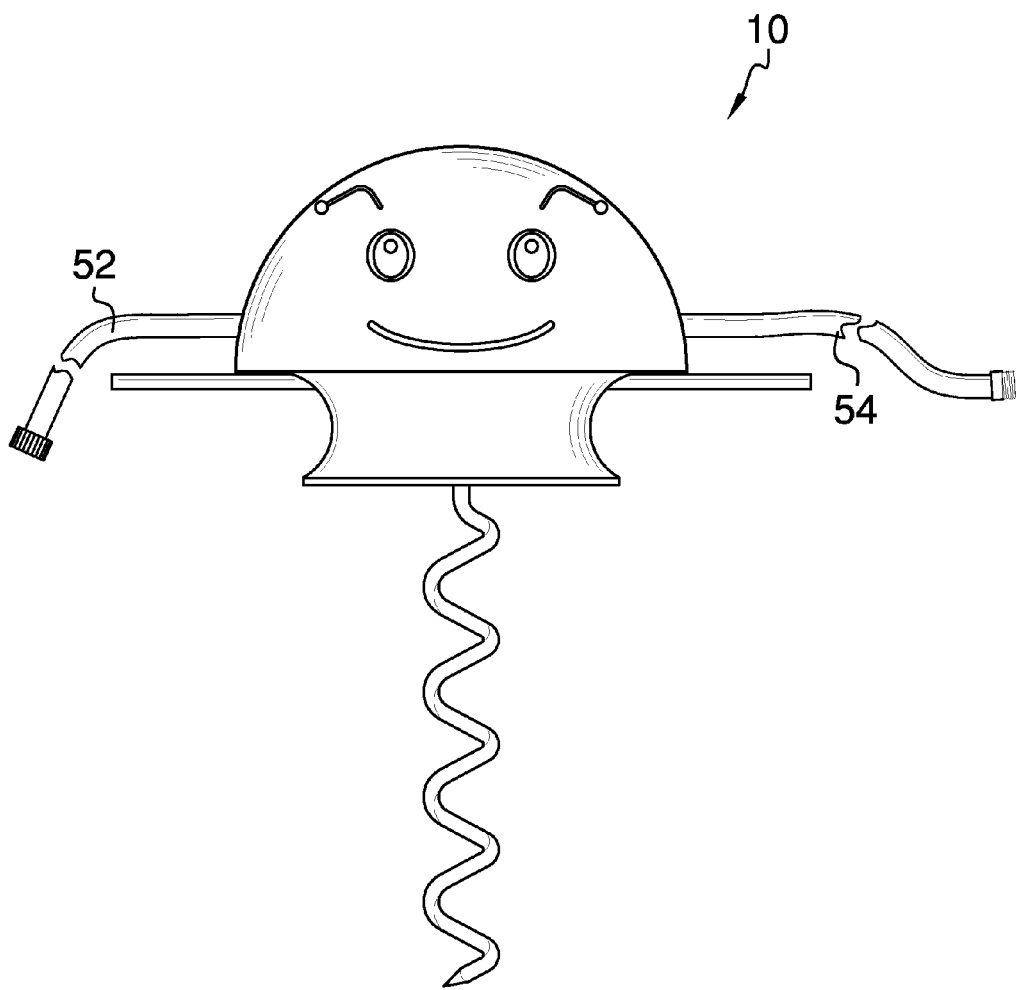
FIG. 4 is an in-use view.

A single circular aperture 50 is continuously disposed from the right portion 30 to the left portion 32 of the top half 22 proximal the bottom surface 28 of the top half 22. The aperture 50 is disposed parallel to the upper end 42 of the torsion member 40. As best shown in FIG. 4, the aperture 50 is configured to slidably engage an exterior surface 52 of the garden hose 54.

What is claimed is:

1. A garden hose guide comprising:
a base comprising a semicircular top half and a bottom half, each of the top half and the bottom half having a bottom surface, a right portion and a left portion, the top half having a top surface;
a spiral stake having a bottom end and a top end;
a torsion member having an upper end, a lower end, a right end region, and a left end region, the torsion member medially disposed within the base from the bottom half bottom surface to the top half bottom surface, the torsion member lower end attached to the spiral stake top end, wherein each of the right end region and the left end region is disposed outside of the base at a length of at least two inches; and
a single circular aperture continuously disposed from the right portion to the left portion of the top half proximal the bottom surface, the aperture disposed parallel to the torsion member upper end;
wherein a diameter of the aperture substantially conforms to a diameter of a garden hose, the aperture configured to slidably engage an exterior surface of the garden hose.

2. The garden hose guide of claim 1 wherein the bottom half of the base is concave.

3. The garden hose guide of claim 1 wherein each of the right end region and the left end region of the torsion member is rubberized.

4. A garden hose guide comprising:
a base comprising a semicircular top half and a concave bottom half, each of the top half and the bottom half having a bottom surface, a right portion and a left portion, the top half having a top surface, the bottom half of the base having a height of at least two feet;
a spiral stake having a bottom end and a top end;
a torsion member having an upper end, a lower end, a right end region, and a left end region, the torsion member medially disposed within the base from the bottom half bottom surface to the top half bottom surface, the torsion member lower end attached to the spiral stake top end, wherein each of the right end region and the left end region is disposed outside of the base at a length of at least two inches;
wherein each of the right end and the left end are rubberized; and
a single circular aperture continuously disposed from the right portion to the left portion of the top half proximal the bottom surface, the aperture disposed parallel to the torsion member upper end;
wherein a diameter of the aperture substantially conforms to a diameter of a garden hose, the aperture configured to slidably engage an exterior surface of the garden hose.

* * * * *